US010370086B2

(12) United States Patent
Vion et al.

(10) Patent No.: US 10,370,086 B2
(45) Date of Patent: Aug. 6, 2019

(54) BLADE FOR A TURBINE ENGINE PROPELLER, IN PARTICULAR A PROPFAN ENGINE, PROPELLER, AND TURBINE ENGINE COMPRISING SUCH A BLADE

(71) Applicant: SNECMA, Paris (FR)

(72) Inventors: Laurence Francine Vion, Moissy-Cramayel (FR); Rasika Fernando, Moissy-Cramayel (FR); Norman Bruno André Jodet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 422 days.

(21) Appl. No.: 15/114,628

(22) PCT Filed: Jan. 22, 2015

(86) PCT No.: PCT/FR2015/050158
§ 371 (c)(1),
(2) Date: Jul. 27, 2016

(87) PCT Pub. No.: WO2015/118243
PCT Pub. Date: Aug. 13, 2015

(65) Prior Publication Data
US 2016/0347440 A1  Dec. 1, 2016

(30) Foreign Application Priority Data

Feb. 5, 2014  (FR) ..................................... 14 50874

(51) Int. Cl.
*F01D 5/14* (2006.01)
*B64C 11/18* (2006.01)
(Continued)

(52) U.S. Cl.
CPC .............. *B64C 11/18* (2013.01); *B64C 11/48* (2013.01); *B64D 27/10* (2013.01); *F01D 5/145* (2013.01);
(Continued)

(58) Field of Classification Search
CPC ... B64C 11/18; B64C 11/24; B64C 2003/148; F01D 5/141; F01D 5/145; F01D 5/148; F04D 29/325; F04D 29/38; F04D 29/382; F04D 29/384; F04D 29/388
See application file for complete search history.

(56) References Cited

U.S. PATENT DOCUMENTS

| 6,231,308 | B1 * | 5/2001 | Kondo | B64O 27/463 |
| | | | | 416/228 |
| 8,061,986 | B2 * | 11/2011 | Xiong | F03D 1/0633 |
| | | | | 416/23 |
| 9,630,704 | B2 * | 4/2017 | Vion | F01D 5/141 |
| 10,099,773 | B2 * | 10/2018 | Beckman | B64O 11/18 |

(Continued)

FOREIGN PATENT DOCUMENTS

| FR | 2980818 A1 * | 4/2013 | ............. F01D 5/141 |
| WO | WO-2013045859 A1 * | 4/2013 | ............. F01D 5/141 |

OTHER PUBLICATIONS

Written Opinion of the International Searching Authority dated Apr. 22, 2015, issued in corresponding International Application No. PCT/FR2015/050158, filed Jan. 22, 2015, 6 pages.
(Continued)

*Primary Examiner* — Igor Kershteyn
*Assistant Examiner* — Topaz L. Elliott
(74) *Attorney, Agent, or Firm* — Christensen O'Connor Johnson Kindness PLLC

(57) ABSTRACT

A blade for a turbine engine propeller, in particular a propfan engine, comprising a protruding part on the leading edge thereof, wherein said blade comprises means for controlling the position of the protruding part along the leading edge thereof.

17 Claims, 4 Drawing Sheets

(51) Int. Cl.
*B64C 11/48* (2006.01)
*B64D 27/10* (2006.01)
*B64D 27/00* (2006.01)

(52) U.S. Cl.
CPC ........ *F01D 5/148* (2013.01); *B64D 2027/005* (2013.01); *F05D 2220/36* (2013.01); *F05D 2240/303* (2013.01); *F05D 2260/96* (2013.01); *F05D 2260/961* (2013.01); *F05D 2270/62* (2013.01); *F05D 2270/64* (2013.01); *F05D 2270/65* (2013.01); *Y02T 50/66* (2013.01); *Y02T 50/673* (2013.01)

(56) References Cited

U.S. PATENT DOCUMENTS

| | | |
|---|---|---|
| 2006/0060720 A1 | 3/2006 | Bogue |
| 2006/0060721 A1 | 3/2006 | Watts et al. |
| 2015/0217851 A1* | 8/2015 | Kelso ................ B64O 3/16 244/200 |

OTHER PUBLICATIONS

International Preliminary Report on Patentability dated Aug. 9, 2016, issued in corresponding International Application No. PCT/FR2015/050158, filed Jan. 22, 2015, 1 page.

International Search Report dated Apr. 22, 2015, issued in corresponding International Application No. PCT/FR2015/050158, filed Jan. 22, 2015, 2 pages.

Written Opinion of the International Searching Authority dated Apr. 22, 2015, issued in corresponding International Application No. PCT/FR2015/050158, filed Jan. 22, 2015, 5 pages.

* cited by examiner

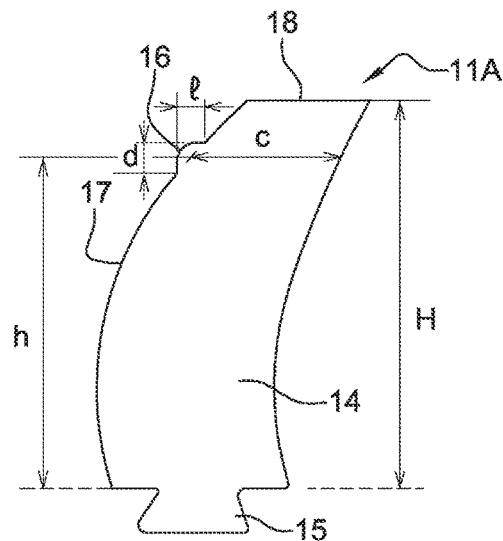
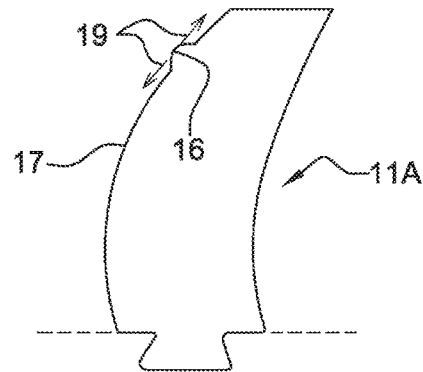
Fig. 2
(PRIOR ART)
Fig. 3
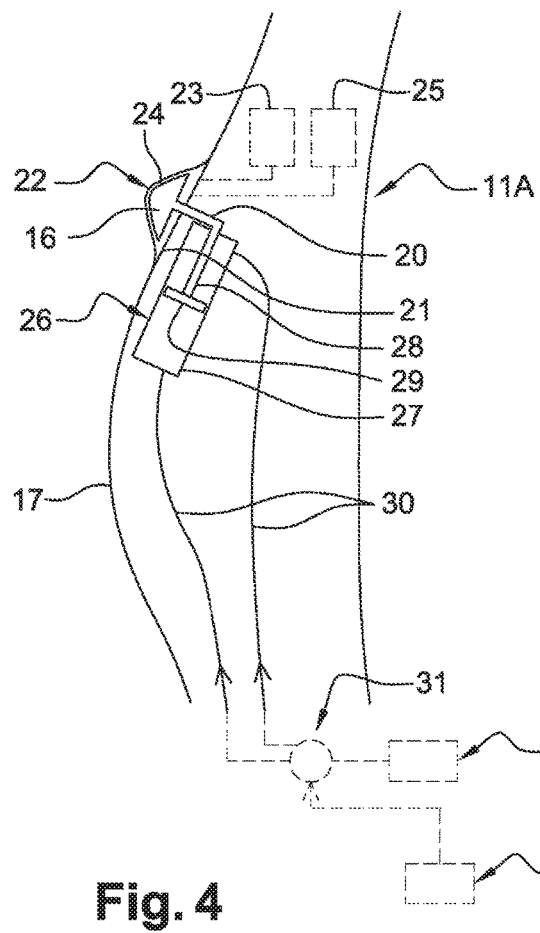
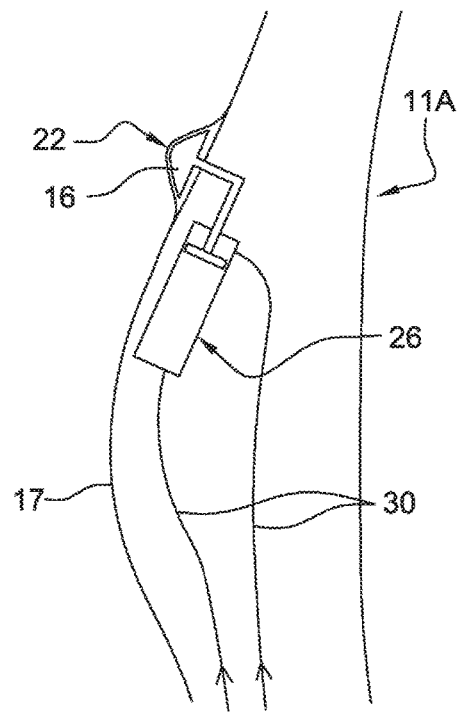
Fig. 4
Fig. 5

BLADE FOR A TURBINE ENGINE PROPELLER, IN PARTICULAR A PROPFAN ENGINE, PROPELLER, AND TURBINE ENGINE COMPRISING SUCH A BLADE

TECHNICAL FIELD

Embodiments of the present disclosure relate to a blade for a turbine-engine propeller, in particular of the unducted-fan type, and to a corresponding propeller and turbine engine.

BACKGROUND

Although the present disclosure is particularly suited to unducted-fan turbine engines, the implementation thereof is however not limited to such an application.

As is known, an unducted-fan turbine engine may comprise two coaxial contra-rotating external propellers, respectively upstream (front) and downstream (rear), which are each rotated by a turbine and extend substantially radially outside the nacelle of the turbine engine. Each propeller usually comprises a hub concentric with the longitudinal axis of the turbine engine, on which blades are fixed.

The aerodynamic interaction between the upstream and downstream contra-rotating propellers of such an unducted-fan turbine engine causes very high operating acoustic levels. This is because the rotation of the upstream and downstream contra-rotating propellers causes, among other things, the formation of:

wakes along the span of the blades, downstream thereof;
main vortices at the free end of the blades.

These aerodynamic disturbances downstream of the upstream propeller are partly the cause of the interaction aerodynamic noise when they strike the downstream propeller or pass close thereto.

In particular, during phases of low-speed operation of an unducted-fan turbine engine (such as, when it is mounted on an aircraft, takeoff, the climbing phase, landing and approach), the dominant contribution of the radiated noise comes from the interaction lines associated with the downstream propeller that functions in the stream of the upstream propeller, passing through the vortex layers consisting of wakes and main vortices formed by the blades of the upstream propeller (also referred to as upstream blades). When a marginal vortex of upstream blades interacts with the blades of the downstream propeller (otherwise referred to as downstream blades), the interaction between downstream blade and marginal vortex dominates the acoustic spectrum radiated for the majority of the directivities.

Thus, in order to reduce the undesirable noise emissions of such turbine engines and thus meet the acoustic certification criteria imposed by the aviation authorities, it is necessary to reduce the low-speed radiated noise by reducing the interaction between downstream blade and marginal vortex.

Currently, the most widespread known solution—referred to as clipping—consists of reducing the diameter of the downstream propeller so as to make the main vortices generated by the upstream blades pass outside the downstream blades in order to limit the interaction of the latter with the main vortices. This generally involves an increase in the chord of the downstream blades in order to maintain the desired traction and the torque ratio between the upstream and downstream propellers. Such a solution may be pushed to the extreme by very highly loading the end of the upstream blades, so as to relieve the remainder of each of the upstream blades in order to reduce the impact of the wake of the upstream propeller on the downstream propeller, also giving rise to undesirable interaction noise.

However, such a solution proves to be acceptably only for an isolated configuration of the turbine engine (that is to say without any external element connected thereto) and without incidence. In the presence of elements (strut, fuselage) or incidence, the contraction and the axisymmetry of the flow of air behind the upstream propeller are modified, so that the clipping carried out no longer prevents the interaction of the downstream blades and the main vortices generated by the upstream blades. A greater reduction in the height of the downstream blades (corresponding to significant clipping) involves an increase in the chord associated with the downstream blades so as to preserve the load, which degrades the efficiency of the associated turbine engine and is therefore not satisfactory.

The applicant proposed another solution to this problem, in the prior application FR 2 980 818. This other solution consists of equipping each upstream blade with a single protrusion on its leading edge, this protrusion being situated in a predetermined location in order to locally disturb, when the propeller rotates, the distribution of the circulation around each blade, so as to form two independent main vortices downstream:

a first natural vortex (or marginal vortex) forming at the free end of the blade;
a second distinct forced vortex (or supplementary main vortex) taking place in the vicinity of the protrusion.

The marginal and supplementary vortices are co-rotating (that is to say they have the same direction of rotation) and remain independent of each other as far as the downstream propeller. In this way a modification to the distribution of the circulation around the single local position is modified and the result is the formation of two vortices—of lower intensity than the single marginal vortex observed in the prior art—that do not merge together.

However, the applicant found that this other solution is not entirely satisfactory since it is not effective irrespective of the operating conditions, that is to say the various flight phases (takeoff, cruising, landing, etc.). This is because the rotation speed of the upstream propeller, the speed of travel of the aircraft equipped with this propeller, and the pitch angle of the blades of this propeller for example, have an influence on the path of the vortices from the leading edges of the blades. In the solution proposed in the prior application FR 2 980 818, the position of the protrusion on each blade is fixed and determined for a single flight phase, preferably takeoff, in order to reduce the noise nuisance for people living near the airport.

SUMMARY

The disclosure thus proposes a blade for a turbine-engine propeller, in particular of the unducted-fan type, comprising a protrusion on its leading edge, comprising means for adjusting the position of the protrusion along its leading edge. Preferably, the protrusion is configured in order, when the propeller rotates, to disturb the distribution of the circulation around the blade, so as to form two independent main vortices downstream.

Conventionally, a turbine-engine propeller blade comprises a suction side and a pressure side that are connected together, upstream, by a leading edge and, downstream, by a trailing edge. Upstream and downstream refer to the flow of the gases across the propeller, the leading edge being a leading edge for the gases and the trailing edge being a trailing edge for the gases. The blade further comprises a bottom or radially inner end, referred to as the root, and a top or radially outer end, referred to as the tip, the radial orientations being defined with respect to the rotation axis of the propeller, which may be the longitudinal axis of the turbine engine.

The disclosure is particularly advantageous since it makes it possible to adjust the position of the protrusion on the leading edge of the blade, in particular according to the operating conditions. It can thus be envisaged for the protrusion on each blade to be in a first position (for example low) during takeoff of the aircraft comprising a turbine engine equipped with blades according to the disclosure, for it to be in a second position (for example intermediate) during the cruising flight of the aircraft, for it to be in a third position (for example upper) during the landing of the aircraft, etc. The protrusion may adopt at least two different positions, preferably a plurality of different positions, along the leading edge of the blade. Naturally the protrusions on the blades of the same propeller are preferably in the same position for an operating condition.

The disclosure is particularly suited to unducted-fan turbine engines, but its implementation is however not limited to such an application. It may for example be applied to a turbine-engine ducted fan in order to limit interactions between the vortex generated by this fan with the aerodynamic structures downstream thereof. It can also apply to a propeller of a turboprop engine to limit interactions between the main vortices generated by this propeller with the wings of the aircraft.

According to one embodiment, the protrusion is situated at the end of a finger that is guided in translation in a groove extending along part of the leading edge of the blade. The adjustment means are thus of the slide type, the groove forming a slide along which the protrusion can translate.

Advantageously, the protrusion and the part of the leading edge comprising the groove are covered with a flexible membrane fixed to the blade. This membrane may be elastically deformable. This is designed so as to allow movement of the protrusion along the leading edge while locally preserving the aerodynamic surface quality of the profile of the blade. It provides in fact continuity of aerodynamic surface between the region of the leading edge in which the protrusion is situated and the rest of the leading edge, as well as between this region and the pressure face and the suction face of the blade. The membrane is preferably relatively thin (it has for example a thickness of between 1 mm and 5 mm). It may be produced for example from polymers covered with an erosion-resistant skin.

The inventors found that the impact of the disclosure on the aerodynamic performance of the propeller is negligible.

Advantageously, the blade comprises means for maintaining the volume contained between the membrane and the leading edge of the blade under vacuum. This enables the membrane best to follow the shape of the protrusion and of the leading edge of the blade. This makes it possible to preserve substantially the exact shape of the protrusion, whatever the position thereof on the leading edge.

The blade preferably comprises means for lubricating the interface between the protrusion and the membrane. This facilitates the movement of the protrusion on the leading edge of the blade.

According to one embodiment, the protrusion is connected to the piston of an actuator controlling the movement of the protrusion along the leading edge. The actuator may be a pneumatic or hydraulic actuator and is then connected to a source of pressurized fluid such as a gas (for example air) or oil.

According to a variant embodiment, the protrusion is connected to an end of at least one cable, the opposite end of which is attached to a rotary shaft with a view to the coiling of the cable around the shaft. The at least one cable may be guided by at least one pulley.

According to another variant embodiment, the protrusion comprises a series of elements made from deformable material of the piezoelectric type. Each of the elements is preferably connected independently to electrical supply means.

Embodiments of the present disclosure also relate to a propeller, in particular for an unducted-fan turbine engine, comprising a plurality of blades of the type specified above.

The propeller preferably comprises a plurality of blades, wherein the protrusions on the blades are connected to the piston rod of a single actuator controlling the movement of these protrusions.

Embodiments of the present disclosure also relate to a turbine engine, in particular of the unducted-fan type, comprising at least one propeller of the aforementioned type.

The turbine engine may comprise a sensor, such as an acoustic receiver, mounted in the vicinity of the propeller and configured so as to transmit information to a computer, this computer being connected to means for actuating the means for adjusting the positions of the protrusions on the blades.

Finally, embodiments of the present disclosure relate to a method for reducing noise emissions of a turbine engine of the aforementioned type, wherein the position of the protrusion along the leading edge of each blade is adjusted according to the operating conditions of the turbine engine, and in particular according to a set of operating parameters comprising for example the rotation speed of the propeller and the pitch angle of its blades.

Optimum positions for the protrusions on the blades may be predetermined for a plurality of operating conditions. The method may then consist, for a given operating condition, of putting the protrusions on the blades in a corresponding predetermined optimum position.

The method may comprise a step of detecting vortices generated by the propeller or of detection of noise generated by the interaction of these vortices with a surface situated downstream, and a step of adjusting the position of the protrusions on the blades according to the signal (such as a noise level) detected at the previous step.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 2 is an enlarged schematic view in elevation of an upstream blade of an unducted fan according to the prior art;

FIG. 3 is an enlarged schematic view in elevation of an upstream blade of an unducted fan according to the disclosure;

FIGS. 4 and 5 show an embodiment of the upstream blade of FIG. 3, in accordance with the present disclosure;

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
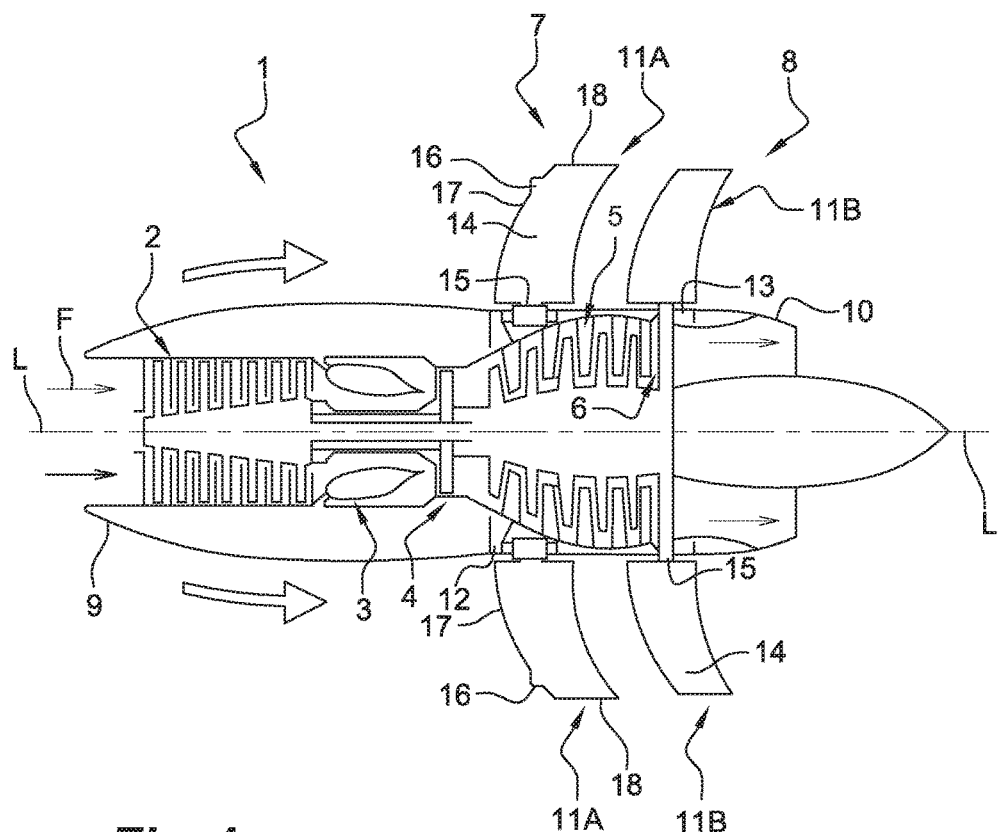
FIG. 1 is a schematic view in longitudinal section of an unducted-fan turbine engine equipped with upstream blades, according to an embodiment in accordance with the disclosure.

FIG. 1 shows, schematically and by way of non-limitative example, an unducted-fan turbine engine 1 in accordance with the disclosure, which comprises, from upstream to downstream, in the direction of flow of the gases (represented by the arrow F) inside the turbine engine of longitudinal axis L-L, a compressor 2, an annular combustion chamber 3, a high-pressure turbine 4 and two low-pressure turbines 5 and 6 that are contra-rotating, that is to say which turn in two opposite directions about the longitudinal axis L-L.

Each of the low-pressure turbines 5 and 6 is constrained to rotate with an external propeller 7, 8 extending radially outside the nacelle 9 of the turbine engine 1, the nacelle 9 being substantially cylindrical and extending along the axis L-L around the compressor 2, the combustion chamber 3 and the turbines 4, 5 and 6. The combustion gases emerging from the turbines are expelled through an exhaust nozzle 10 in order to increase the thrust.

The propellers 7 and 8 are disposed coaxially one behind the other and comprise a plurality of blades 11A and 11B equiangularly distributed around the longitudinal axis L-L. The blades 11A and 11B extend substantially radially and are of the variable pitch type, that is to say they can turn about their longitudinal axis so as to optimize their angular position according to the required operating conditions of the turbine engine 1. Naturally, in a variant, the blades of the propellers could also be of the fixed pitch type.

Each upstream 7 or downstream 8 propeller comprises a rotary hub 12, 13 supporting the blades 11A, 11B and disposed concentrically with the longitudinal axis L-L of the turbine engine 1, perpendicular thereto.

The upstream 11A and downstream 11B blades are each formed by a blade body 14 and a blade root 15, mounted so as to rotate on the corresponding hub 12, 13.

FIG. 2 shows the prior art as described in the prior application FR 2 980 818. In this prior art, each blade 11A of the upstream propeller 7 comprises a single protrusion 16 formed on the leading edge 17 of the blade 11A in question.

This protrusion 16 has a rounded form and is defined by the following parameters:
- a fixed position on the span h, which is between 0.75 H and 0.85 H, with H the height of the upstream blade 11A;
- a height on the span d, which is between 0.05 H and 0.2 H; and
- a chord width l, which is between c/16 and c/8, with c the length of the local chord of the blade at the position on the span h of the protrusion 16.

The protrusion 16 provides a disturbance of the distribution of the circulation around the upstream blade 11A, which causes two co-rotating main vortices:
- a first natural vortex (or marginal vortex) forming at the free end 18 of the upstream blade 11A;
- a second distinct forced vortex (or supplementary main vortex) taking place in the vicinity of the single protrusion 16.

The protrusion 16 also causes the formation of contra-rotating auxiliary vortices (that is to say in an opposite direction to the two marginal and supplementary vortices) that are inserted between the two co-rotating main vortices, thus preventing merging thereof before impacting the downstream propeller 8.

In other words, when the upstream propeller 7 rotates, the protrusion 16 locally disturbs the distribution of the circulation around the upstream blade 11A, so as to form two independent main vortices downstream and which remain as far as the downstream propeller 8.

This solution makes it possible to divide the acoustic source into two sources out of phase, which leads to a reduction in the interaction noise.

The disclosure, the principle of which is shown schematically in FIG. 3, represents an improvement to this technology.

The inventors have found that the target traction (for a relevant flight point, which represents the force necessary for moving the aircraft), in particular in the case of a pair of propellers, can be achieved by means of various combinations of parameters such as: the rotation speed of the propellers and the pitch angle of their blades. A different distribution of circulation around the upstream blade 11A corresponds to each combination of parameters. It is therefore necessary to adapt the position of the protrusion 16 to the flight point in question in order to act as effectively as possible. Studies have shown that the position of the protrusion 16 is decisive in obtaining the required effect. This is because this protrusion 16 has the effect of influencing the generation of vortices by the leading edges of the blades. However, these depend, in terms of position and intensity, on the flight parameters, such as the speed of travel of the aircraft, the speed of rotation of the propellers and the angular pitch of the blades. The inventors have in fact found that the paths of the vortices of the leading edges on the suction faces of the blades depend on the flight configurations, and therefore that the position of the vortices varies according to the flight parameters. It would therefore be necessary for the position of the protrusions to be adapted to the position of the vortices in order to significantly reduce the interaction noise during the various flight phases.

The solution proposed consists of a protrusion 16 located on the leading edge 17 of the blade 11A, the positioning (arrows 19) of which along this leading edge, that is to say along the span h of the blade, can be adapted to the flight point (takeoff, flight over, cruising, approach, etc.). The solution thus meets the aforementioned requirement.

For this purpose, the disclosure proposes equipping the blade 11A with means for adjusting the position of the protrusion 16 along its leading edge 17.

FIGS. 4 and 5 show a non-exclusive embodiment of the disclosure in which the adjustment means are of the runner type.

The protrusion 16 is here formed by a dome and is carried by a finger 20 that is guided in a groove 21 extending along part of the leading edge 17 of the blade 11A.

The protrusion 16 can be brought to, and held, in any position on the leading edge 17, between two respectively bottom (FIG. 4) and top (FIG. 5) extreme positions. In the case where the optimum position of the protrusion 16 can vary between 0.75 H and 0.85 H (H being the height of the upstream blade 11A) according to the operating positions, the bottom extreme position in FIG. 4 is situated at 0.75 H and the top extreme position in FIG. 5 is situated at 0.85 H.

The protrusion 16 and the part of the blade 11A extending around the groove 21 are covered with a membrane 22, preferably flexible and thin, which is intended to follow the shape of the protrusion 16 and of the leading edge 17 in order to ensure continuity of aerodynamic surface between the protrusion 16 and the rest of the blade and to limit pressure drops in operation. The part of the membrane 22 covering the protrusion 16 defines a boss that reproduces, preferably as faithfully as possible, the shape and dimensions of the protrusion 16. The movement of the protrusion 16 along the leading edge 17 causes a deformation, preferably elastic, of the membrane 22. The boss defined by the membrane 22 then moves, following the protrusion 16.

As shown schematically by the drawings, the blade 11A is preferably equipped with:
- firstly means 23 for lubricating the interface 24 between the protrusion 16 and the membrane 22, for example by the injection of lubricating oil at this interface, in order to limit the friction forces between the protrusion 16 and the membrane 22 that may oppose the movement of the protrusion,
- and secondly means 25 for putting under vacuum the space contained between the membrane 22 and the protrusion 16, and preferably also between the membrane and the part of the blade covered by the membrane 22. These means 25 are for example means for aspirating gas intended to maintain a negative pressure in the aforementioned space, so that the membrane remains pressed against the protrusion and the blade.

It will be understood that the blade 11A is, in the example shown, at least partly hollow and comprises at least one internal cavity for housing the aforementioned means 23, 25.

The finger 20 is connected to actuation means that comprise, in the example shown, a control actuator 26 of the pneumatic or hydraulic type. The actuator 26 comprises a cylinder 27 secured to the blade 11A and a piston rod 28 that is connected to the finger 20. The protrusion 16 is moved from one position to another along the leading edge 17 of the blade 11A by movement of the piston rod 28 relative to the cylinder 27 of the actuator 26, the piston rod 28 being able to emerge from the cylinder 27 or retract into this cylinder 27.

Conventionally, the end of the piston rod 28 opposite to the finger 20 carries a disc 29 for separating two internal chambers, respectively front and rear, of the cylinder 27. Each chamber is connected to means for supplying pressurized fluid (gas, oil, etc.) and discharging this fluid, in order to cause the movement of the piston rod 28 relative to the cylinder 27 and therefore the movement of the protrusion 16. The supply and discharge means comprise here fluid conduits 30 that are intended to be connected to a pump 31 and to a fluid source 32 preferably situated outside the blade.

The pump 31 is actuated by a computer 33 that thus controls the movement and position of the protrusion 16 on the blade 11A.

Figure 6:
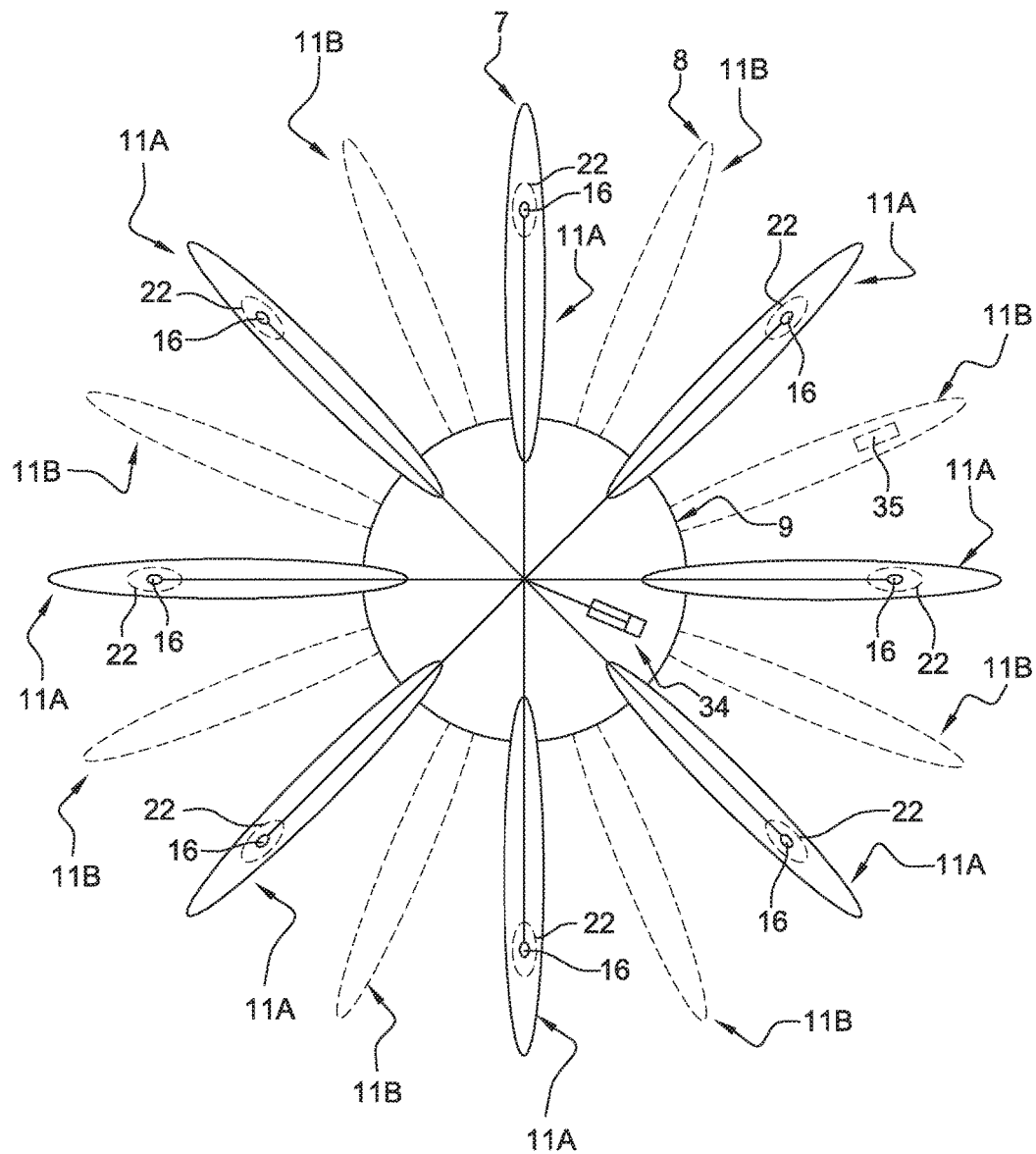
FIG. 6 is a schematic view of a turbine-engine propeller comprising blades according to a variant embodiment of the disclosure.

As shown in FIGS. 4 and 5, each blade 11A of the propeller may be equipped with its own actuator 26. In a variant and as shown in FIG. 6, a single actuator 34 makes it possible to control, for example by means of a linkage system, the movement of the protrusions 16 on all the blades 11A of the propeller 7, which are also at least partly hollow. This actuator 34 may be mounted in the nacelle 9 of the turbine engine 1.

The optimum position of the protrusion 16 on the leading edge 17 of a blade 11A may: (i) either be defined upstream of the design by means of digital computations, recorded in the engine flight commands, and managed by the computer 33, (ii) or be determined during the flight by means of the computer 33.

In the first case (i), the optimum positions of the protrusions 26 on the blades 11A, which at a time t, must all be identical, are computed and predetermined according to the various flight points in order to optimize the required purpose, namely reducing the noise nuisances related to the interaction of the main vortices generated by the blades of the upstream propeller 7 with those of the downstream propeller 8. It is considered that each flight point or each operating condition is defined by a set of a plurality of parameters, including the rotation speed of the propeller, the speed of travel of the aircraft equipped with this propeller, and the pitch angle of the blades of the propeller. Thus a pre-programmed position is available for each set of parameters. It will thus be understood that the computer 33 will control the movement of the protrusions 16 on the blades according to the current flight point.

The other case (ii) may consist of equipping the turbine engine 1 with at least one sensor 35 such as a pressure sensor or an acoustic receiver. The computer 33 then comprises a control algorithm for adjusting the position of the protrusions 16 so as to minimize the acoustic signal perceived by the sensor 35. The sensor 35 is preferably positioned close to the region of impact of the vortices, for example on one of the blades 11B of the downstream propeller 8, as shown in FIG. 6.

The above description refers to an unducted-fan turbine engine. Although the invention disclosure is particularly suited to such a turbine engine, it is not limited to this application and can be applied to other types of turbine engine such as a turboprop engine or a ducted-fan turbine engine.

In the case of a turboprop engine, the disclosure can be applied to the propeller of this turboprop engine so as to limit the noise nuisances related to the interaction of the main vortices generated by the propeller with the fuselage of the aircraft and/or with the nacelle of the turboprop engine. The aforementioned sensor 35 may thus be mounted on the fuselage of the aircraft or the nacelle of the turboprop engine.

In the case of a ducted-fan turbine engine, the disclosure can be applied to the fan propeller so as to limit the noise nuisances related to the interaction of the main vortices generated by this propeller with the strut connecting the turbine engine to the aircraft. The aforementioned sensor 35 may thus be mounted on the strut.

Figure 7:
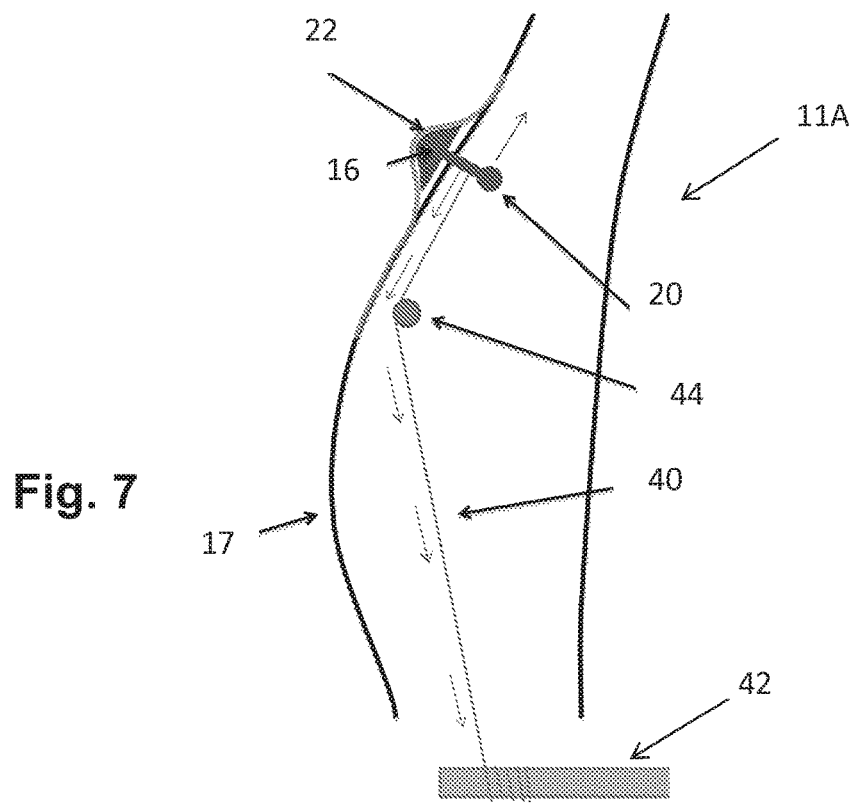
FIG. 7 shows a variant embodiment of a blade according to the disclosure.

FIG. 7 is a view corresponding to FIG. 4 and depicting a variant embodiment of the disclosure and more particularly a variant embodiment of the means for adjusting the position of the protrusion 16 along the leading edge 17 of the blade 11A, which are here of the cable 40 type.

The protrusion 16 is here formed by a dome and is carried by a finger 20 that is guided in a groove extending along a part of the leading edge 17 of the blade 11A.

The protrusion 16 may be brought into, and held, in any position on the leading edge 17, between two respectively bottom and top extreme positions. In the case where the optimum position of the protrusion 16 may vary between 0.75 H and 0.85 H (H being the height of the upstream blade 11A) according to the operating conditions, the bottom extreme position is preferably situated at 0.75 H and the top extreme position is preferably situated at 0.85 H.

The protrusion 16 and the part of the blade 11A extending around the groove are covered with a membrane 22, preferably flexible and thin, which is intended to follow the form of the protrusion 16 and of the leading edge 17 in order to provide continuity of aerodynamic surface between the protrusion 16 and the rest of the blade and to limit pressure drops in operation. The part of the membrane 22 covering the protrusion 16 defines a boss that reproduces, preferably as faithfully as possible, the form and dimensions of the protrusion 16. The movement of the protrusion 16 along the leading edge 17 causes a deformation, preferably elastic, of the membrane 22. The boss defined by the membrane 22 then moves, following the protrusion 16.

As shown schematically in the drawings, the blade 11A is equipped with at least one cable 40, one end of which is attached to the finger 20 and the opposite end of which is attached to a rotary shaft 42 and is configured firstly so as to coil around the shaft when the latter turns in a first direction about its rotation axis, and secondly to uncoil when the shaft turns in a second, opposite direction. In the example shown, the coiling of the cable 40 around the shaft 42 causes a movement of the protrusion 16 towards the low position, and an uncoiling of the cable causes a movement of the protrusion towards the high position. The latter movement is made possible in operation by the centrifugal forces to which the protrusion 16 is subjected, related to the rotation of the propeller. This is because, in operation, the protrusion 16 is subjected to a continuous force, oriented towards the direction opposite to the tension of the cable 40.

It will be understood that the blade 11A is, in the example shown, at least partially hollow and comprises at least one internal cavity housing the cable 40.

It is possible to mount, in the cavity of the blade 11A, one or more pulleys 44 for guiding the cable, in order to facilitate the kinematics of the system and to optimize the forces exerted on the sliding connection between the protrusion 16 and the blade 11A.

Figures 8, 9:
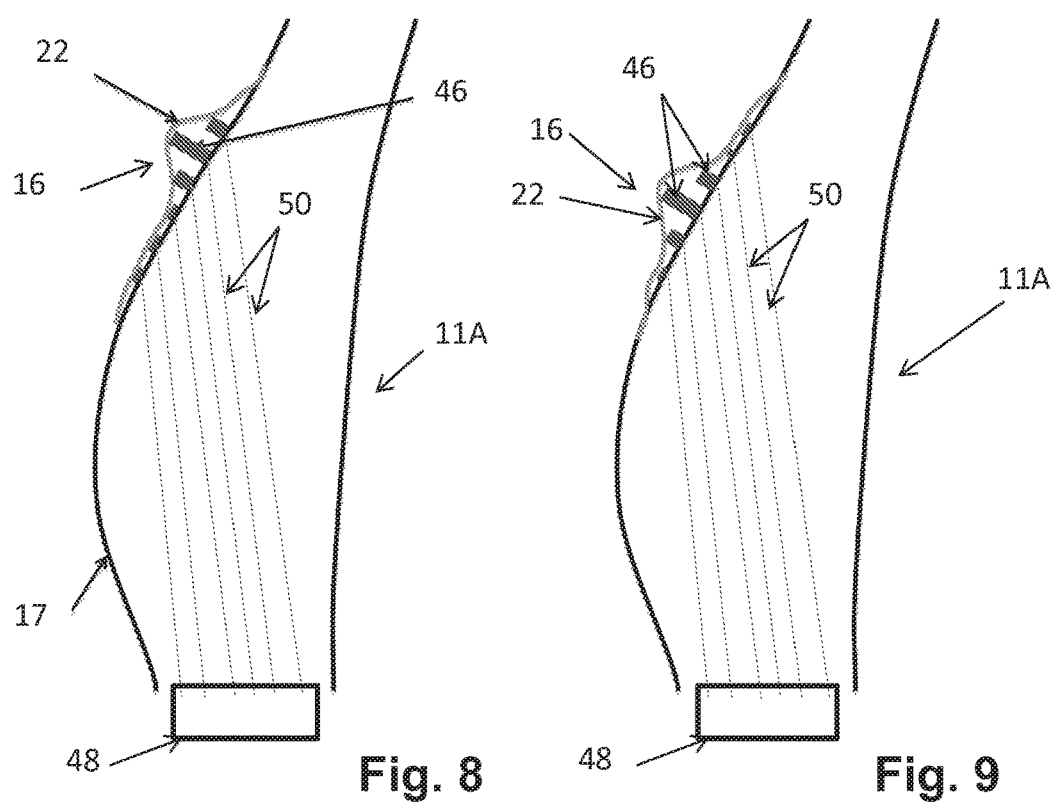
FIGS. 8 and 9 show another variant embodiment of a blade according to the disclosure.

FIGS. 8 and 9 are views corresponding to FIG. 3 and showing another variant embodiment of the disclosure and more particularly a variant embodiment of the means for adjusting the position of the protrusion 16 along the leading edge 17 of the blade 11A, which here have a deformable material of the piezoelectric type for example. Such a material is a material that deforms when it is subjected to an electric current.

The protrusion 16 is here formed by a series of elements 46 produced in such a material and disposed alongside one another along a part of the leading edge 17 of the blade 11A.

The form of the protrusion 16 can be modified and may comprise a protrusion at any position on the leading edge 17, between two extreme positions respectively top and bottom. In the case where the optimum position of the protrusion 16 can vary between 0.75 H and 0.85 H (H being the height of the upstream blade 11A) according to the operating conditions, the bottom extreme part is preferably situated at 0.75 H and the top extreme part in FIG. 8 is preferably situated at 0.85 H (FIG. 9 shows an intermediate position).

The elements 46 of the protrusion 16 are covered with a membrane 22, preferably flexible and thin, which is intended to follow the form of the protrusion 16 and of the leading edge 17 in order to provide continuity of aerodynamic surface between the protrusion 16 and the rest of the blade and to limit the pressure drops in operation. The part of the membrane 22 covering the protrusion 16 defines a boss that reproduces, preferably as faithfully as possible, the form and dimensions of the protrusion 16. The deformations of the protrusion 16 along the leading edge 17 cause a deformation, preferably elastic, of the membrane 22. The boss defined by the membrane 22 then moves following the protrusion 16.

As shown schematically in the drawings, the blade 11A is equipped with means 48 for electrical supply to the elements 46, the means 48 being connected to the elements by electric wires 50. Each element can be supplied independently so as to obtain the required form of the protrusion 16.

It will be understood that the blade 11A is in the example shown at least partly hollow and comprises at least one internal cavity housing the wires 50 or even the supply means 48.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A blade for a propeller of a turbine engine of the unducted-fan type, comprising:
   a blade body having a leading edge and a trailing edge;
   a protrusion disposed on the leading edge and
   means for adjusting the position of the protrusion along the leading edge.

2. The blade according to claim 1, wherein the protrusion is situated at an end of a finger that is guided in translation in a groove extending along a part of the leading edge.

3. The blade according to claim 2, wherein the protrusion and the part of the leading edge comprising the groove are covered with a flexible membrane fixed to the blade body.

4. The blade according to claim 3, wherein the space contained between the membrane and the leading edge of the blade is configured to maintain a vacuum.

5. The blade according to claim 3, comprising means for lubricating an interface between the protrusion and the membrane.

6. The blade according to claim 1, wherein the protrusion is connected to a piston rod of an actuator controlling the position adjustment of the protrusion along the leading edge.

7. A propeller comprising a plurality of blades according to claim 6, wherein the actuator is a single actuator common to the plurality of blades, and wherein the protrusions on each of the plurality of blades are connected to the piston rod of the single actuator.

8. The blade according to claim 1, wherein the protrusion is connected to one end of at least one cable, an opposite end of which is attached to a rotary shaft so that the cable may be coiled around said shaft.

9. The blade according to claim 8, wherein said at least one cable is guided by at least one pulley.

10. The blade according to claim 1, wherein the protrusion comprises a series of elements made from deformable material of the piezoelectric type.

11. The blade according to claim 10, wherein each of said elements is connected independently to electrical supply means.

12. A propeller for an unducted-fan turbine engine, comprising a plurality of blades according to claim 1.

13. A turbine engine of the unducted-fan type, comprising at least one propeller, the least one propeller comprising a plurality of blades according to claim 1.

14. The turbine engine according to claim 13, comprising a sensor mounted in the vicinity of the at least one propeller and configured to transmit information to a computer, the computer being connected to means for actuating the means for adjusting the positions of the protrusions on the blades.

15. A method for reducing the noise emissions of the turbine engine according to claim 13, comprising: adjusting the position of the protrusion along the leading edge of each blade according to the operating conditions of the turbine engine.

16. The method according to claim 15, wherein optimal positions of the protrusions on the blades are predetermined for a plurality of operating conditions, the method further comprising, for a given operating condition, of putting the protrusions on the blades in the corresponding predetermined optimum position.

17. The method according to claim 15, comprising:
detecting vortices generated by the at least one propeller or detecting a noise caused by an interaction of these vortices with a surface situated downstream of the at least one propeller, and
adjusting the position of the protrusions on the blades according to said detection.

* * * * *

UNITED STATES PATENT AND TRADEMARK OFFICE
CERTIFICATE OF CORRECTION

PATENT NO.        : 10,370,086 B2
APPLICATION NO.   : 15/114628
DATED             : August 6, 2019
INVENTOR(S)       : L. F. Vion et al.

Page 1 of 1

It is certified that error appears in the above-identified patent and that said Letters Patent is hereby corrected as shown below:

| Column | Line | Error |
|---|---|---|
| 11 (Claim 13, Line 2) | 10 | "the least one propeller" should read --the at least one propeller-- |

Signed and Sealed this
Seventh Day of April, 2020

Andrei Iancu
*Director of the United States Patent and Trademark Office*